United States Patent [19]

Tessera et al.

[11] 3,872,447

[45] Mar. 18, 1975

[54] COMPUTER CONTROL SYSTEM USING MICROPROGRAMMING AND STATIC/DYNAMIC EXTENSION OF CONTROL FUNCTIONS THRU HARDWIRED LOGIC MATRIX

[75] Inventors: Giancarlo Tessera, Milan; Ferruccio Zulian, Cornaredo (Milan), both of Italy

[73] Assignee: Honeywell Information Systems Italia, Milan, Italy

[22] Filed: Apr. 2, 1973

[21] Appl. No.: 347,316

[30] Foreign Application Priority Data

Apr. 7, 1972 Italy .................................. 22889/72

[52] U.S. Cl. .............................................. 340/172.5

[51] Int. Cl. .............................................. G06f 9/16

[58] Field of Search .................................. 340/172.5

[56] References Cited

UNITED STATES PATENTS

| | | | |
|---|---|---|---|
| 3,268,871 | 8/1966 | Handler et al. | 340/172.5 |
| 3,579,192 | 5/1971 | Rasche | 340/172.5 |
| 3,631,405 | 12/1971 | Hoff | 340/172.5 |
| 3,646,522 | 2/1972 | Furman et al. | 340/172.5 |
| 3,725,868 | 4/1973 | Malmer, Jr. et al. | 340/172.5 |
| 3,736,567 | 5/1973 | Lotan et al. | 340/172.5 |

*Primary Examiner*—Harvey E. Springborn
*Attorney, Agent, or Firm*—Fred Jacob

[57] ABSTRACT

A digital electronic data processing system having a read only storage memory for executing microoperation commands is provided with a logical sequence matrix which becomes operative when needed. The matrix which is referred to as a "hardware sequencer" serves to deliver additional microoperation commands which are appended to the microoperation commands generated by the read only storage memory microinstructions.

8 Claims, 5 Drawing Figures

COMPUTER CONTROL SYSTEM USING MICROPROGRAMMING AND STATIC/DYNAMIC EXTENSION OF CONTROL FUNCTIONS THRU HARDWIRED LOGIC MATRIX

BACKGROUND OF THE INVENTION

The present invention relates to binary data handling systems wherein the different logical and arithmetical operations to be executed are controlled by a set of microinstructions stored in a read-only memory contained in said systems, that is, to so-called microprogrammed computers, as defined and explained hereafter.

It is known that binary electronic computers are designed and built in order to execute a predetermined set of instructions, for example:

Binary sum, Binary subtraction, Decimal sum, Decimal subtraction, Write in a register from a memory cell, Shift, Compare, and so on.

These instructions only are available to the programmer, who in building up the working program for the computer, must use these instructions without considering the way in which they are carried out by the computer.

Practically, as regards the computer, such instructions comprise a succession of groups of elementary operations, such as the setting up of predetermined circuits of a logic network, or the transfer of suitable electrical signals across the electrical network.

These elementary operations are called "microoperations" and the set of microoperations executed simultaneously, that is, in a single elementary clock interval is called a "microinstruction." The sequence of microinstructions needed for carrying out a single program instruction is a "microprogram."

Until some years ago, the method of executing such microoperations, microinstructions and microprograms depended on the manner in which the computer was designed and built, that is, it depended on the so-called "hardware" of the computer. In other words, the correlation between the program instructions, and the microoperations needed for executing the same, was defined by the physical structure of the control unit of the computer and therefore could not be changed without changing such physical structure, that is, the wiring and the components of the control unit of the computer.

Practically said correlation was set up by the so-called "Logical Sequence Matrix," that is, a decoding network, accepting as input a binary code, representative of the instruction to be executed, and delivering at its output a pattern of binary values representative of the set of microoperations to be carried out.

This decoding network may accept, in addition, a set of signals representative of peculiar conditions of the apparatus, which may condition and modify the binary signals at the output of the logical sequence matrix. Thus, an instruction may carry out the execution of a plurality of microinstructions in consecutive time intervals, that is, a microsequence, by means of the logical sequence matrix.

During the last few years, however, attempts have been made to render the computer more flexible than before, and to make it capable of executing different acts of machine instructions according to the requests of different users, remaining, of course, within the limits of the intrinsic capabilities allowed by the available set of microoperations. To achieve this object, without changing the hardware of the machine, it was necessary to break up the one-to-one correlation between instructions and microoperations imposed by the structure of the machine, and to establish such correlation in an indirect way, by the use of a memory device, capable of delivering a set of signals, each one corresponding to a microoperation, in response to an instruction, the information corresponding to said signals being stored in the memory device.

By modifying the contents of said memory device, it is possible to differently organize the set of microoperations, and, as a result, to obtain the execution of the set of instructions of different machine languages, without changing the circuitry of the computer.

The modern computer is therefore built according to these criteria, and comprises a non-destructive, modifiable memory called ROS (Read Only Storage), containing the information capable of controlling the microoperations. The ROS stores a plurality of words, each one comprising a plurality of bits, and each machine instruction is an address for the ROS, causing the reading out of one or more ROS words in succession.

Each read-out ROS word specifies a set of microoperations to be executed, that is, a microinstruction. The simplest way of using such information is to assign each bit for controlling a single microoperation. Thus, for example, the binary value of a bit is ONE if the corresponding microoperation must be carried out, and is ZERO in the opposite case. As the number of microoperations which can be carried out in a computer may be of the order of several hundreds, a one-to-one correspondence between bits and microoperations would require words of exceptional length and therefore ROS memories of very high capacity, and cost.

The designers have therefore striven to substantially reduce the storage capacity needed by the ROS memory for containing the required microinstructions. Different ways have been tried for reaching this result, one of them consisting, for example, in arranging the microoperations in groups of mutually intrinsically exclusive microoperations, and to represent each microoperation of a group in coded form. By intrinsically mutually exclusive microoperation it is meant that these microoperations are such that no two of them can be carried out in the same clock interval.

Another method, called "adaptive decoding," consists in using a certain number of bits of each microinstruction as a "function code," for interpreting the remaining bits of the microinstruction.

A further method consists in an adaptive decoding method using a variable length function code, as described in the copending U.S. Patent application Ser. No. 317,894, filed Dec. 29, 1972, now U.S. Pat. No. 3,812,464, issued May 21, 1974, assigned to the same assignee as the present application.

The purpose of such method is to reduce the length of the microinstructions without substantially reducing the flexibility assured by a microinstruction control system.

SUMMARY OF THE INVENTION

This is also the purpose of the present invention and the result is obtained substantially by adding to the ROS memory a logical sequence matrix, which will hereafter be called a "hardware sequencer," which becomes operative when needed, that is, when predetermined conditions are verified, such as the reading out of predetermined microinstructions corresponding to specific ROS addresses, and in this case serves to deliver additional microoperation commands which are appended to the microoperation commands generated by the ROS microinstructions.

Thus, a static extension of the control functions carried out by the microinstruction is obtained, without need of a greater length of the original microinstruction.

This is only one of the advantages of the invention, as the hardware sequencer can modify the commands, in response to predetermined conditions, during the execution of a single microinstruction, just as the microinstruction could modify itself according to the circumstances.

Thus, a dynamic extension of the microinstruction is obtained, by which the microcommands of a microinstruction at a prefixed address may be changed. This means also that a plurality of microinstructions having a first part in common, and differing by a second part, may be substituted by a single microinstruction of reduced length, corresponding to the common part, and by a variable extension generated by the hardware sequencer according to conditions. It will be readily apparent that the storage capacity of the ROS is remarkably reduced.

It is suitable to comment on another aspect of the invention, which justifies the name of dynamic extension, as a result of the combined use of a ROS memory and a hardware sequencer.

The execution of an instruction in general requires executing a number of subsequent microinstructions, forming a microprogram. A reduction of the storage capacity of the ROS may be obtained by expedients which permit one to execute the same instruction by a lesser number of microinstructions stored in ROS, that is, by a shorter microprogram: and this may be obtained by the use of the hardware sequencer. Indeed, as the hardware sequencer steps on along a sequence of sets of microcommands, in response to given conditions of the computer and according to a suitable clocking, while the ROS microinstruction remains unchanged, a set of subsequent microinstructions having a common fixed part and a variable part is made available. Thus, a dynamically variable extension of the microinstruction is obtained, and the length of the stored microprogram is reduced.

A further advantage is offered by the fact that, in the present state of the art, the operating time of the read-only memories, such as the ones employed by microprogram storage, obtained usually by MOS technology, is remarkably greater than the operating time of logical circuits following bipolar technologies. Therefore, the use of the hardware sequencer permits one to achieve higher performance in terms of operating speed.

It may be added that a hardware sequencer may be produced which is simple and rugged in construction, as it comprises a relatively small number of printed wireboards, its task being an auxiliary one, the main control operations being carried out by the ROS memory. It may consist of a functional unit which is easily interchangeable, and therefore it is possible to have at ones disposal a number of hardware sequencers, each one oriented towards a specific requirement.

BRIEF DESCRIPTION OF THE DRAWING

These advantages and features of the invention will appear clearly from a detailed description of a preferred embodiment provided for exemplifying, not limiting purposes, with reference to the attached drawing, in which.

DESCRIPTION OF THE PREFERRED EMBODIMENT

Figure 1:
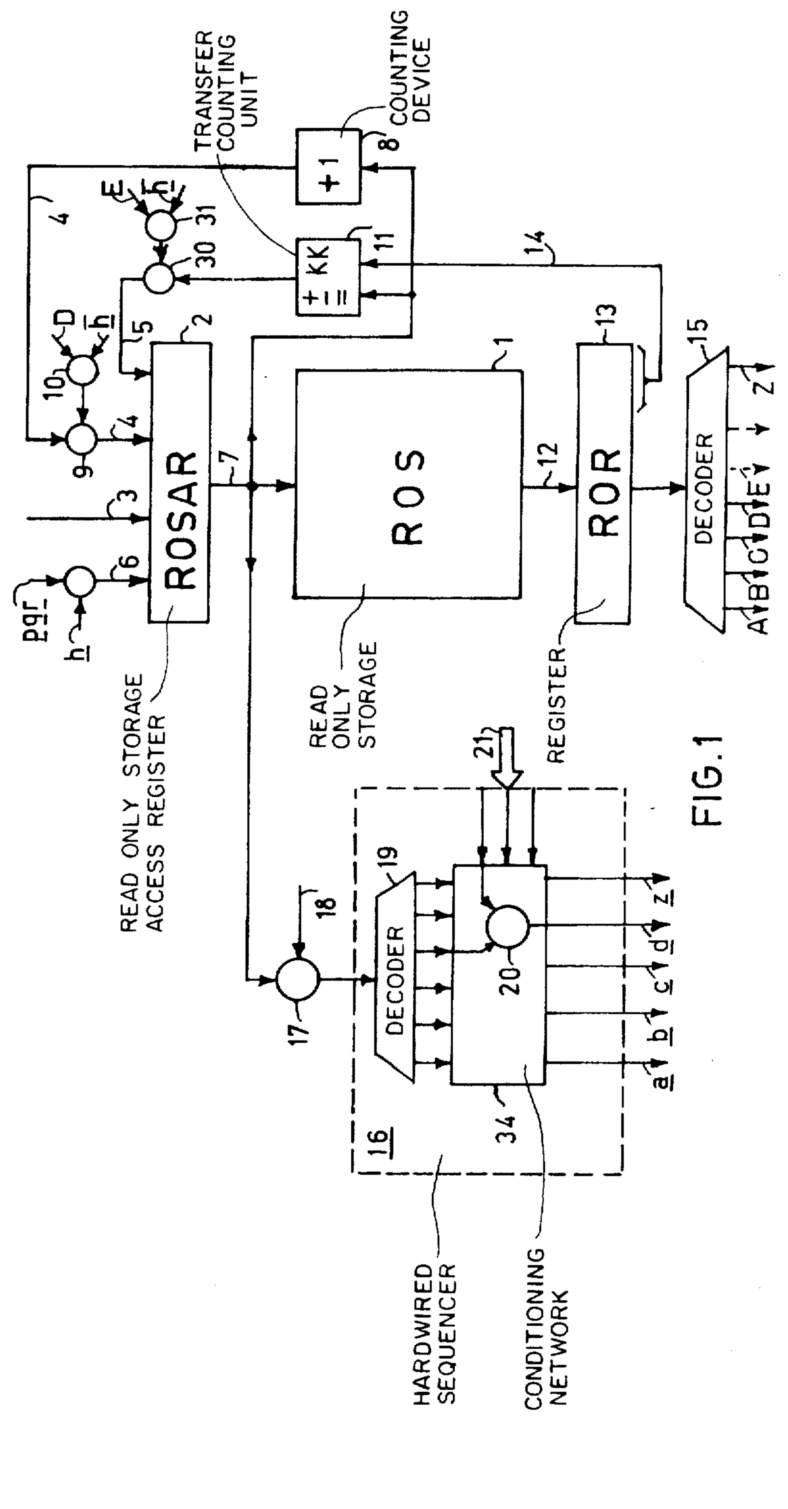
FIG. 1 shows a block diagram of a first embodiment of the invention.

FIG. 1 is the schematic block diagram of a first preferred embodiment of the invention.

Reference numeral 1 indicates a programming read-only storage device (ROS) with individual microinstructions stored at respective address locations. It is provided with an address register 2, called ROSAR, for "Read Only Storage Access Register," which is loaded with the succession of addresses of the microinstructions controlling the computer.

Register 2 is loaded by means of input channels 3, 4, 5 and 6 selectively activated. For example, channel 3 may be used for setting register 2 in an initial state corresponding to a prefixed ROS address, that is, for "initializing" the computer.

Channel 4 may be used for setting register 2 in a state corresponding to the preceding address, incremented by one: it may be seen that the contents of ROSAR is applied thru channel 7 to a counting device 8 which increments the address by one and applies it to the input channel 4, under control of an unit 9, comprising for instance a plurality of AND gates. Thus the updated address may be loaded into ROSAR only under specified conditions.

Such condition is represented by the presence of a microcommand D, resulting from the decoding of the microinstruction being executed, and by the absence of an inhibiting microcommand $h$ (that is, by the presence of its complement $\overline{h}$) at the input leads of the AND gate 10.

Channel 5 may be used for setting register 2 in a state corresponding to a new prefixed address, by an unconditioned jumping instruction, or by a relative addressing microinstruction. It may be seen that the contents of ROSAR is applied thru channel 7 to a transfer-counting unit 11, which may modify these contents by the amount ± KK and apply the updated address to the input channel 5. It may also apply, to the input channel, the amount KK only. This amount KK which may be added, subtracted or transferred is applied to the unit 11 thru channel 14 and is originated, as will be explained later, by an unconditioned jumping microinstruction, or by a relative addressing microinstruction.

In this case also, a gate set 30 is present on channel 5 and the updated address is loaded into register 2 only under predetermined conditions (microcommands E and $\overline{h}$ applied to AND gate 31).

A similar addressing function may be carried out, under conditions, by channel 6.

Except for the initializing operation, in all other cases the modification of the address in ROSAR happens at definite times, as controlled by a clocking device (not shown).

The contents of ROSAR addresses, thru channel 7, the ROS memory 1, which includes read out means responsive to the address code. The read out means reads out the specific microinstruction and loads it into register 13 (ROR) thru channel 12. The microinstruction may comprise some bits specifying the amount ± KK by which the subsequent ROS address must be modified, and if it is required be added, subtracted or transferred. The remaining part of the microinstruction in register 13 is decoded by decoder 15, (for the description of which reference may be made to the above mentioned Patent Application), which delivers a set of elementary microoperation commands, indicated by A, B, C, . . . , Z. They control the operations of the computer and the development of the program: for example, as mentioned, the microcommand D enables the incrementing by one the address thru channel 4, and the microcommand E enables the updating of the address thru channel 5. The presently described structure is in conformance with the present state of the art.

According to the present invention, this logical structure is integrated by additional elements which provide for the extension, static as well as dynamic, of the control functions carried out by the same.

FIG. 1 shows that the content of the ROSAR register is also applied to a decoding and conditioning network 16, by means of channel 7 thru an enabling unit 17, comprising for example a set of AND gates, which allows the transfer of the contents of ROSAR only if an enabling signal is present on lead 18. This enabling signal may be originated from the microinstruction in ROR, or be generated by the decoder 15, or also, may always be present.

The address transferred from ROSAR 2 is decoded by a decoder 19, delivering a set of signals, which are transferred, thru a conditioning network 34, to the output of the unit 16, serving as conversion means originating a set of additional microcommands indicated by *a, b, c, . . . z.* The conditioning network 34 may comprise a set of AND gates such as gate 20, each one provided with one or more conditioning inputs, which carry signals representative of prefixed conditions of the central processing units of the computer: these signals are represented as a whole by the arrow 21.

During the execution of a program, the same microprogram address may occur more than one time, and each time the conditions of the central processing unit may be different, and as a consequence the additional microcommand may also be different.

Thus, the reading out from the ROS memory of a microinstruction at a prefixed address generates a set of fixed microcommands A, B, C, . . . Z, and a set of additional microcommands *a, b, c, . . . z* which may change according to conditions. This means that in the considered time interval everything happens as if a sequence of microinstructions are read out and executed.

During the same time interval additional microcommand *h,* as seen, inhibits by means of gate sets 9 and 30 any modification of the address in ROSAR through channels 4 and 5. The same additional microcommand *h,* or another suitable one, may enable the channel 6, by means of which suitable additional microcommands *p, q, r* may be transferred to ROSAR as new addresses. Thus, the microprogramming network and static-dynamic extension network interact mutually, as each one of them may condition the operation of the other, thru predetermined condition signals, or address codes. It may also be remarked that the set of additional microcommands is not correlated to the microinstruction generating the microcommands A, B, C, . . . Z, but to the address of the microinstruction. This increases the flexibility of the dynamic extension system according to the invention. If the additional microcommands generated by the network 16 were obtained by decoding the microinstruction read out from the ROS, and loaded into ROR, all identical microinstructions, even if contained in different microprograms, would originate, under the same conditions of the central processing unit, the same dynamic extension, that is, the same sequence of additional microcommands. The use of the ROS address contained in ROSAR for generating the additional microcommands, on the contrary, frees the program from such limitations, and may provide for each microinstruction, in respect to its location in the program, the most suitable structure and sequence of additional microcommands. Of course, the intervention of the network 16 takes place only when an enabling signal is present on lead 18, and for predetermined addresses recognizable by the decoder 19.

However versatile, this logical organization has some restrictions. For example, it does not allow to reallocate the microprograms in the ROS, because this would require a modification of the addresses corresponding to a prefixed microprogram, and of the network 16.

Figure 2:
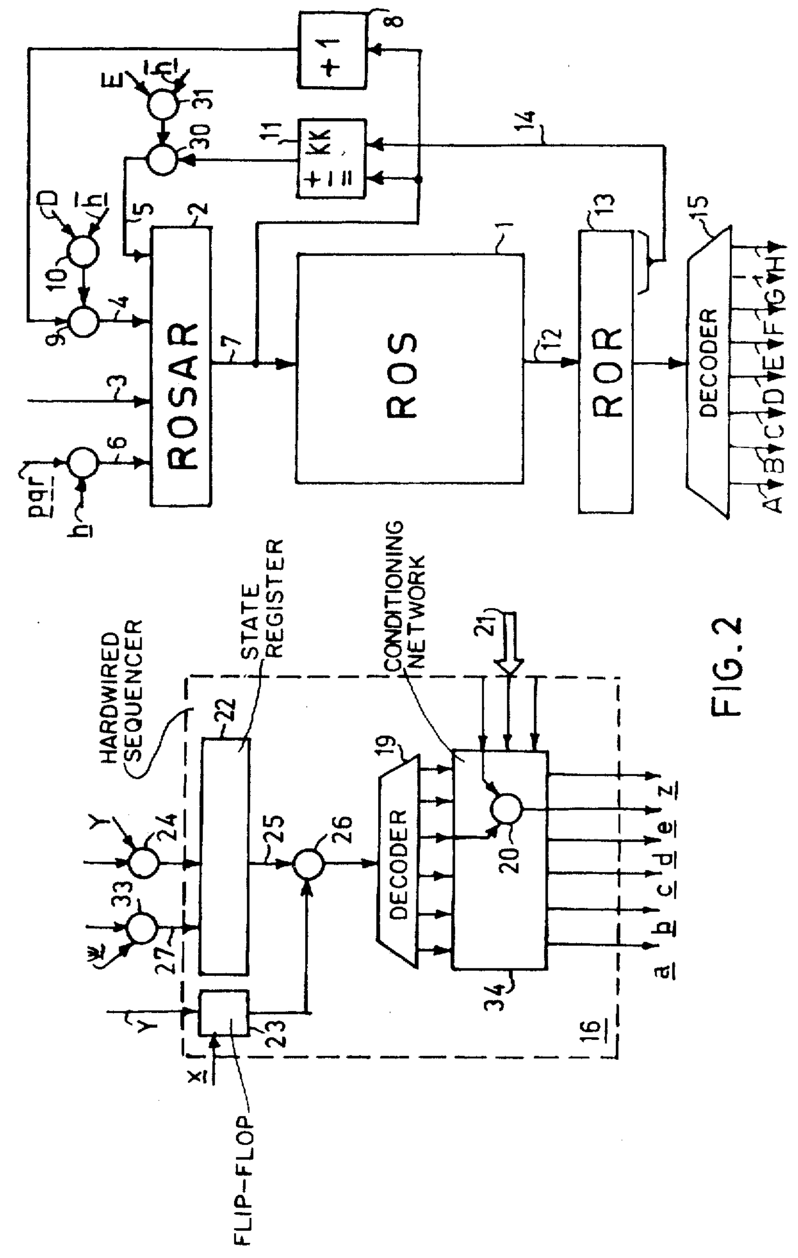
FIG. 2 shows the block diagram of a second embodiment thereof.

Within the scope of the invention, a different embodiment of the combined control by means of a microprogramming storage, and a logical static and dynamic extension network, may be preferred, and is shown in FIG. 2.

The microprogramming system using the ROS memory is the same as the one described with reference to FIG. 1, and the common components are referred to by the same numerals.

However, means for connecting the microprogrammer and the hardware sequencer is different.

The decoding and conditioning network 16 comprises, in this case, a state register 22 and an enabling flip-flop 23.

A specific microinstruction is provided for effecting the operation of the network 16. This microinstruction may for example take the following meaning: "Enable intervention of network 16 by setting flip-flop 23 and load the state register 22 with the code here indicated." A microinstruction of this type is comprised in the group of transfer microinstructions usually provided for transferring a quantity specified by the microinstruction from the ROS to a register also specified by the microinstruction.

In other words, this microinstruction may be formed by three sections: a function code, specifying that the operation to be carried out is a transfer; an address code, indicating to which register the quantity must be transferred; and a third part expressing in binary form the quantity, or the address of the register, or of the memory location which contains the said quantity.

As a microinstruction of this type is contained in the register ROR, the decoding network 15 breaks down the instruction in said three sections, and delivers a command, indicated by Y, which sets the flip-flop 23 and enables the loading of the quantity specified by the third section of the microinstruction into the state register 22, by enabling the unit 16, comprising for example a group of AND gates.

The contents of such register, through the output channel 25 and the enabling unit 26 controlled by the flip-flop 23, is applied to the decoder 19 and decoded by the same.

The decoded signals, under the conditions set by the central processing unit and applied through channels 21, originate also in this case the set of additional microcommands *a, b, c, . . . z*, which may change as these conditions change.

Thus, in this case also, a static as well as dynamic extension of the microoperation set is obtained, but the microprograms are no longer subject to any constraint, and may be reallocated at will in the ROS memory, because the network 16 is activated in response to a specific microinstruction which may be located at any address of the ROS, and is no longer conditioned by the persistence of a microinstruction in the ROR register 13, but by the condition of the state register 22, which holds this condition as long as needed. It may be noted that the same additional microcommands, or part of the same, may be used for modifying the contents of the state register 22.

To this effect an input channel 27 may be enabled by an enabling unit 33 controlled by an additional microcommand such as *w*, and may carry a set of signals, corresponding to a convenient subset of additional microcommands. Thus the hardware sequencer may step on under the combined control, both of the conditions applied by channel 21, and of the said additional microcommands.

The switching-off of the hardware sequencer is controlled by one of the additional meirocommands. As indicated by FIG. 2, the additional microcommand *x* resets the flip flop 23 and therefore inhibits the unit 26, preventing the transfer of information through channel 25. By the microcommand *h* the address contained in ROSAR may again be modified.

The execution of a microprogram may therefore occur according to the following sequence of operations.

A sequence of microinstructions are read-out from the ROS and loaded in succession into the ROR register, and executed. The last microinstruction of the sequence commands the transfer of a quantity into state register 22. This operation is executed, and, at the same time, a new microinstruction is loaded into ROR register 13. At this point the hardware sequencer is activated, and the central processing unit is controlled by the set of microcommands delivered by ROR and by the additional microcommands delivered by the hardware sequencer, thus obtaining a static extension of the microinstruction. The hardware sequencer steps on along a sequence of states, according to its internal organization and to the external conditions received through channels 21. At the same time the microinstruction contained in ROR remains unchanged, or it may change in step with the changing of the additional microcommands.

Thus, a dynamic extension has been obtained, as if a sequence of fictitious microinstructions were loaded into register 13 to originate a sequence of microcommands.

It must be remarked that the speed at which the additional microcommands are delivered by the hardware sequencer is limited by the speed of operation of the newtwork 16, which in general is fabricated according to technologies allowing higher speed than that of the microprogramming memory, and therefore the dynamic extension of the microinstruction by means of the hardware sequencer not only allows one to spare a noteworthy portion of the memory capacity of the ROS, but also provides a high operating speed. However, as stated, the hardware sequencer and the ROS memory may also operate in step.

To better explain the above concepts, an example of a microprogram extended by means of the hardware sequencer is now described in detail.

Figure 3:
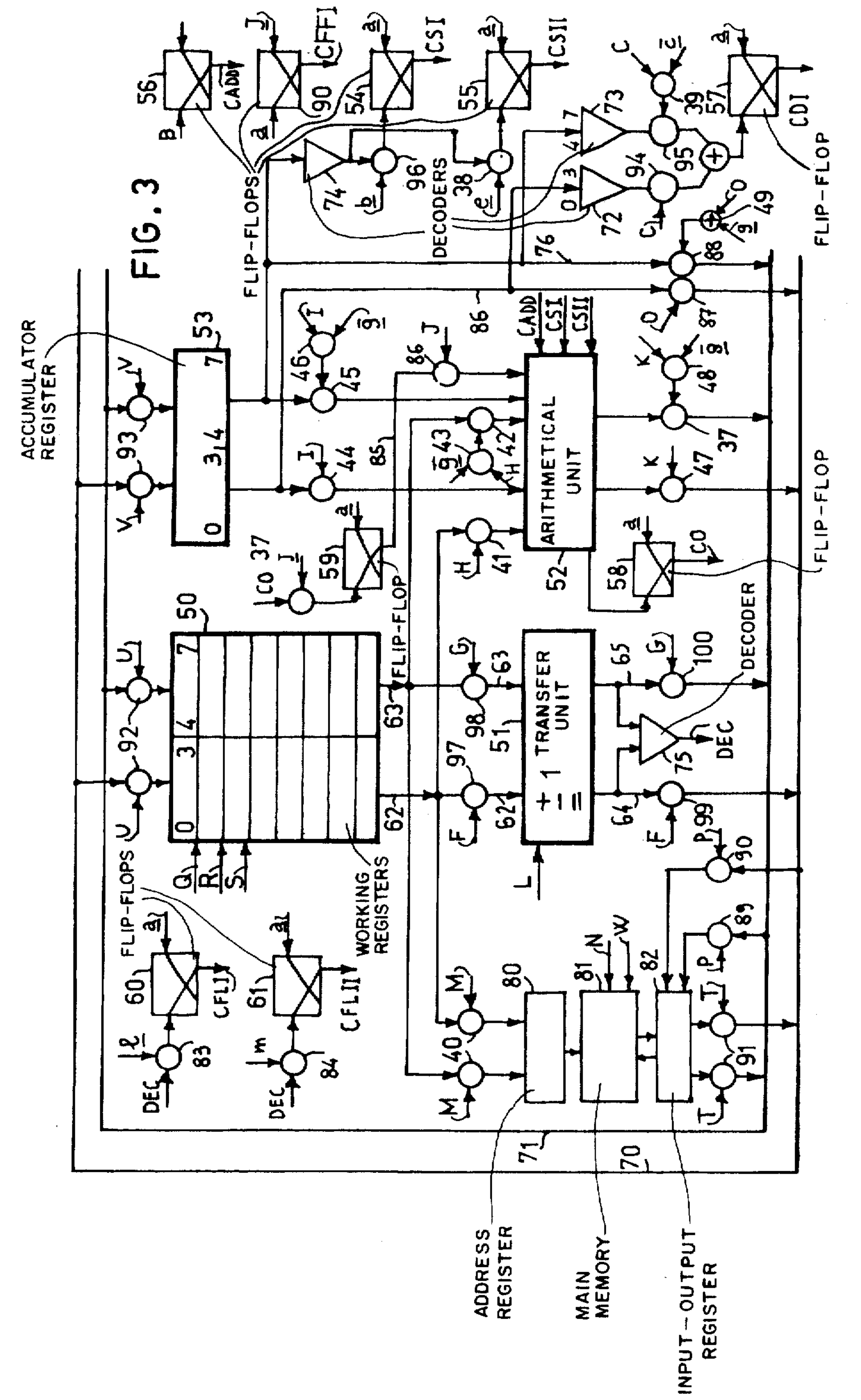
FIG. 3 is a logical block diagram of the central processing unit of a computer controlled according to the invention.

FIG. 3 shows the schematic block diagram of a portion of the structure of an electronic computer, taken as an example.

The computer comprises a group of working registers 50, each one having a capacity of 8 bits, a counting and transferring unit 51, an arithmetical unit 52, and 8-bit accumulator register 53, a number of flip-flops, 54,55,56 . . . 61, for memorizing special state conditions, and suitable connection channels between the units, conditioned by a set of gates by which they may be enabled or inhibited for transferring the data. The logical gates designated by a symbol and a reference numeral are intended to represent, in most cases, a set of gates controlled by the same signal and operating on all leads comprised in the channel. Only the most important connection channels are represented.

The computer of the example has a parallelism of 8 bits, but may be operated on packaged numerals, that is, decimal numerals expressed by 4-bit codes, and contained in pairs in each 8-bit word.

The structure of the computer will be better understood by an example of operation controlled by a microprogram extended by the hardware sequencer.

It is assumed that the operation to be executed is the decimal sum of a first operand and a second operand; the result must be stored in the memory field occupied by the first operand. The operands are formed by a plurality of bits, representative of a plurality of decimal digits and a sign. Their structure is as follows:

| | | | | |
|---|---|---|---|---|
| D, D | D, D | D, D | D, S | First operand |
| D, D | D, D | D, D | D, S | Second operand |

Each letter D represents a group of four bits, meaning a decimal digit, and the letter S represents a group of four bits, meaning a sign.

The operands are stored in memory locations comprising a number of eight-bit groups (octets), identified by an address and a length, expressed in number of octets. The address identifying the operand is the address of the octet containing the sign.

The decimal sum instruction comprises a sequence of bits, specifying, in the order, the operation to be carried out;

the memory address of the first operand;

the memory address of the second operand; and the length of the first operand, in number of octets.

When this instruction is interpreted by the computer, a preparatory phase, called "fetching" takes place under control of a microprogram, which predisposes the computer for the execution of the instruction, and loads the addresses and length of the operands in predetermined registers 50. The description and discussion of this fetching phase are not necessary for the understanding of the invention, and will be omitted. Afterward, the executive phase is initiated, which will be described in detail, on the assumption that it is controlled by a microprogram contained in ROS and by the hardware sequencer.

As heretofore, capital letters indicate the microcommands generated by the ROS, and small underlined letters the microcommands originated by the hardware sequencer. Alphanumeric signals indicating computer conditions are represented by one or more characters preceded by the letter C.

Figure 4:
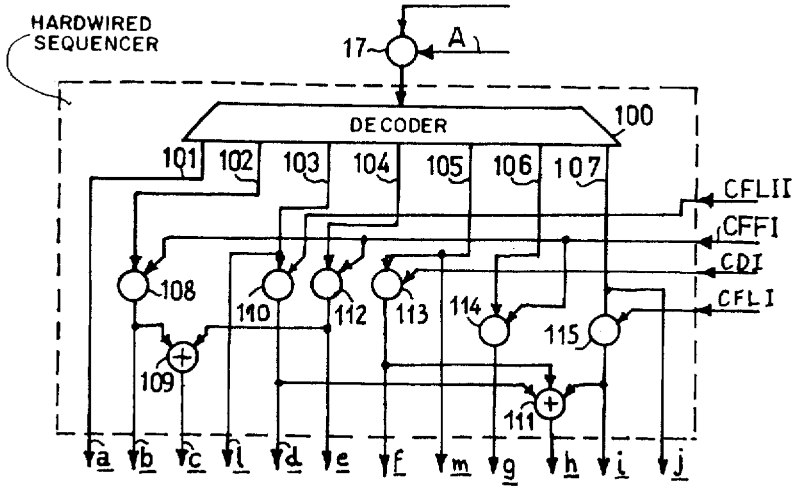
FIG. 4 is the logical diagram of a network used as a hardware sequencer.

In the example illustrated, the hardware sequencer has the structure shown by FIG. 4 and is associated to the ROS memory as shown by FIG. 1.

The microprogram addresses are transferred from register ROSAR to the decoder 100 by an enabling signal on lead 18 controlling AND gate 17. It is assumed that this signal is a microcommand A.

The outputs 101 to 107 of this decoder deliver the additional microcommands, either directly or through suitable gates controlled by signals representative of conditions of the central processing unit.

The lead 101 delivers at the output of the hardware sequencer an unconditioned microcommand *a*.

The lead 102 is connected to an AND gate 108 controlled by a signal CFF 1, delivered by a condition flip-flop 90 (FIG. 3), designated as "First time flip-flop." The output of AND gate 108 delivers a microcommand *b* and also, through OR gate 109, a microcommand *c*.

The lead 103 directly delivers a microcommand 1 and is also connected to an AND gate 110 controlled by a signal CFL II generated by a condition flip-flop indicated by 61 in FIG. 3, and designated as "second operand end-of-length flip-flop." The output of ANd gate 110 delivers the microcommand *d* and, in addition, through OR gate 111, the microcommand *h*.

The lead 104 is connected to AND gate 112, controlled by the above mentioned signal CFF I. The output of this gate delivers the microcommand *e* and, through OR gate 112, the microcommand *c*.

The lead 105 delivers an unconditioned microcommand *m*, and is also connected to an AND gate 113 controlled by a signal CDI generated by condition flip-flop 57 (FIG. 3) designated as "Invalid digit flip-flop." The output of AND gate 113 delivers a microcommand *f* and, thru gate 111, also microcommand *h*.

The lead 107 delivers a direct microcommand *j* and is also connected to an AND gate 115 controlled by a signal CFL I generated by the condition flip-flop 60 (FIG. 3) designated a "First operand end-of-length flip-flop." The output of AND gate 115 delivers a microcommand *i* and, through OR gate 111, also microcommand *h*.

Summing up, when the microcommand A is on, and the address in ROSAR reads out a microinstruction in ROS which calls for the operation of the hardware sequencer, the address in ROSAR is decoded by decoder 100 (FIG. 4) delivering a plurality of additional microcommands *a*, *b*, *c*, . . . *j*. The set of microcommands A to Z and the additional microcommands *a* to *j* are applied to the logical elements of the central processing unit and thus control the execution of the microprogram.

The subsequent steps of the microprograms are now described in detail; the microinstructions read out in succession are indicated by the bracketed numerals (151), (152) . . . . which may be regarded as addresses of the associated microinstruction in ROS (151) Add The first microinstruction specifies that the operation to be carried out is an algebrical addition on decimal digits. It delivers a microcommand B which sets the flip-flop 56 (FIG. 3), which in turn delivers a condition signal CADD (addition command), applied to the arithmetical unit, so that it will execute the specified addition.

The microinstruction also calls for the operation of the hardware sequencer, and therefore generates the microcommand A, if this is not a fixed microcommand. The address (151) is decoded by decoder 100, which delivers a reset microcommand *a* on lead 101. This microcommand resets all condition flip-flops of the central processing unit, with the exception of flip-flops 56 and 90.

As shown by FIG. 3, the flip-flops 54, 55, 57, 58, 59, 60, and 61 are reset by microcommand *a*, which, in addition, sets the flip-flop 90, thus generating the condition signal CFF I.

(152) Read-out first operand

This microinstruction specifies that the first operand stored in the main memory must be read out. The microcommand combination Q R S and the microcommands M and N are generated.

The microcommand combination Q R S selects the one, among the registers 50, which contains the address of the first octet of the first operand, and the microcommand M enables the AND gate 40, allowing this address to be transferred through channels 62 and 63 into the address register 80 of the main memory 81.

Microcommand N enables the reading-out from the main memory, and therefore after this operation the input-output register 82 of the main memory stores the requested data. It must be noted that during this operation the intervention of the hardware sequencer is not required, and therefore the decoder 100 does not generate any command in response to instruction address (152).

(153) Transfer first operand into accumulator and register and check conformity This microinstruction generates the microcommands C, Q, R, S, T, U, V and requires the operation of the hardware sequencer 16, which in turn decodes address (153) and generates the additional microcommands *b* and *c*. The flip-flop 90 has been set by microinstruction (151) and the hardware sequencer receives the condition signal CFF I. Microcommands Q, R, S specify which one of the registers 50 must be loaded with the first octet of the operand. Microcommands T, U, V, by enabling the AND gates 91, 92, and 93, allow the transfer of the data from the main memory register 82 through the main channels 70 and 71, to the selected register and to the accumulator 53. At the same time this data appears at the output of the decoders 72 and 73; which check the conformity of the numerical data.

If the binary code representative of the numerical value of the data is not comprised in those which represent the decimal digits, the flip-flop 57 is set, delivering an error signal which will later on stop the execution of the program.

As the numerical value is assumed to be represented in packaged form, the two halves of the octet are separately checked by the decoders 72 and 73; as this is the first octet of the operand, in which the bits 4 to 7 specify the sign, only the output of decoder 72 is transferred to flip-flop 57 by a microcommand C enabling the AND gate 24. The inverted additional microcommand *c*, by inhibiting the AND gates 39 and 95, prevents the transfer of the decoded output of decoder 73 to the flip-flop 57. The conformity check is therefore carried out on bits 0 to 3 only, and not on the sign bits. The sign bits are applied also to decoder 74 which, through the AND gate 96 enabled by microcommand *b*, acts on the flip-flop 54, setting the same in a state representative of the sign. The condition signal CSI, thus delivered by the flip-flop 54 is applied to the arithmetic unit 52.

(154) Decrement the length of the first operand-jump on condition.

This microinstruction provides for the decrease by one the length of the operand contained in one of the registers 50. It generates the microcommands A, Q, R, S, F, G, U, which specify (Q, R, S) the register 50 which stores the length of the first operand and transfers this length to the counting unit 51 through channels 62 and 63, by means of microcommands F and G acting on AND gates 97 and 98. The length of the first operand is decreased by one, applied to channels 64 and 65 and from there it is transferred, by microcommands F, G and U, enabling the AND gates 99, 100 and 92, to the main channels 70 and 71 and again into the register from which it has been read out. The output of the counting unit 51 is decoded by the decoder 75 and, if the actual value of the operand length is zero, a signal DEC is emitted. This signal sets the flip-flop 60 through the AND gate 83 enabled by the additional microcommand *l*. Thus the condition signal CFL I is emitted, which will be employed by the following instruction as meaning "First operand end-of-length."

The hardware sequencer responds to address (154) by delivering a signal on lead 103, that is, the above named microcommand *l*. Other commands are delivered by the sequencer if the condition CFL II is present. In this case, the microcommands *d* and *h* are generated. Microcommand *d* specifies a predetermined microprogram address, and microcommand *h* inhibits the usual updating of the ROS address in ROSAR, and enables the channel 6 to load into ROSAR the address *p*, *q*, *r*, as specified by microcommand *d*.

If the condition CFL II is not present, the hardware sequencer does not deliver any microcommand apart from *l* and the microprogram proceeds to the following microinstruction.

(155) Read-out second operand and update address

This microinstruction is similar, as regards the reading-out operation, to the one described for the first operand (152). The only difference is, that microcommands Q, R, S now specify the register in which the address of the second operand is stored. It also specifies that the address of the second operand must be updated for further use, by increasing it by one.

The micrommands L, F, G are also generated.

The microcommand L causes the counting unit 51 to increase by one the value applied to its input. Microcommands F and G enable the AND gates 97, 98, 99, 100, and therefore the address of the second operand is transferred on channels 62 and 63 to the counting unit 51, increased by one, then transferred through channels 64 and 65 to the main channels 70 and 71, and reloaded into the same register as before. This microinstruction does not require the operation of the hardware sequencer, and therefore the decoder 100 does not respond to address (155).

(156) Second operand in Accumulator

This microinstruction generates microcommands C, T, V; in addition the decoder 100 of the hardware sequencer responds to this address, and delivers a signal on lead 104. The condition signal CFF I, which is present, enables the AND gate 112 and generates the microcommands *c* and *e*.

The microcommands T and V enable AND gates 91 and 93 to transfer the data from the main memory through main channels 70 and 71 to the accumulator 53. At the same time the data appears at the outputs of the accumulator and is applied to the decoders 72 and 73 which checks it for conformity.

If the binary code representing the data is not comprised of those representing the decimal digits, the flip-flop 57 is set, delivering an error signal which will later stop the program.

As it is asssumed that the numerical values are stored in packaged form, the two halves of the octet are separately checked by the decoders 72 and 73, and, as this is the first octet of the second operand, in which the bits 4 to 7 specify the sign, only the output of the decoder 72 is transferred by microcommand C to flip-flop 57, whereas the inverted additional microcommand *c* inhibits the AND gates 39 and 95, and prevents the transfer of the output of the decoder 73. The conformity check is therefore carried out on bits 0 to 3 only, and not on the sign bits.

The sign bits 4 to 7 are applied also to the decoder 74, and its output, enabled by microcommand *e* acting on AND gate 38, sets the flip-flop 55 in a state representative of the sign. The signal CS II delivered by this flip-flop is applied to the arithmetical unit 52 and controls its operation in a following step of the microprogram.

(157) Decrement length of the second operand jump on condition.

As with microinstruction (154), this microinstruction provides for the decrease by one the length of the operand, contained in one of the registers 50. This microinstruction generates the microcommands A, Q, R, S, F, G, U, which control the decreasing by one the length of the second operand and to transfer the same through the proper channels. At the same time the output of the counting unit 51 is decoded by decoder 75, and, if the length of the second operand is reduced to zero, this output sets the flip-flop 61, generating the condition CFL II.

On the other hand, the hardware sequencer decodes the microinstruction address and generates a signal on lead 105 which delivers the microcommand *m* for setting the flip-flop 61 through AND gate 84 when the signal DEC is present.

In addition, if the conformity condition is not verified, that is, if the flip-flop 57 is set, the hardware sequencer receives condition signal CDI: the signal of lead 103 is transferred through AND gate 113 and originates the microcommands *f* and *h*. The microcommand *h* (FIG. 1) inhibits the updating of the address contained in ROSAR, and enables the channel 6 to load into ROS an address *p*, *q*, *r*, defined by microcommand *f*. The microinstruction read out at this address will stop the program.

If, on the entry, the condition signal CDI is not present, the hardware sequencer does not generate any microcommand and the microprogram steps on to the following microinstruction.

(158) Operate on accumulator and register and write in accumulator.

This microinstruction effectively carries out the algebric addition. It generates the microcommands A, Q, R, S, H, I, J, K, V. The address (158) decoded by decoder 100 delivers a signal on lead 106, which, in turn, generates the microcommand *g* if the signal CFF I is present. The microcommand *g* specifies that the addition must be carried out only on bits 0 to 3 and not on bits 4 to 7, which are representative of the sign. The microcommand H enables the transfer of bits 0 to 3 from the register specified by microcommands Q, R, S, to the arithmetical unit 52 through channel 62, by acting on AND gate 43. The bits 4 to 7 are not transferred, because AND gate 42 is inhibited by microcommand *g* acting on AND gate 43.

Similarly, the microcommand I enables the transfer of bits 0 to 3 from the accumulator to the arithmetical unit 52, by enabling AND gate 44, whereas the transfer of bits 4 to 7 is inhibited by microcommand *g* inhibiting gate 37 through gate 48. However, the bits 4 to 7 in the accumulator are transferred through the by-pass channel 76, enabled by microcommand *g* acting through OR gate 49 and AND gate 88, to the main channel 71 and reloaded into the accumulator.

It must be remarked that the arithmetic unit 52 takes into account a possible carry from a preceding operation, by a signal generated by flip-flop 59 which may be applied through lead 85 and AND gate 86 enabled by microcommand J. However, this flip flop has been reset by microcommand *a* and therefore the carry is, at this step, null. The carry which may result from the operation just carried out, is applied by the output of the arithmetical unit to flip-flop 58, setting the same. The signal CO generated by flip-flop 58 in a following step of the microprogram will, in turn, set the flip-flop 59.

(159) Write the contents of accumulator in main memory

This microinstruction generates the microcommands A, Q, R, S, M, O, P, V.

Microcommands Q, R, S specify the register containing the memory address of the first operand, that is, the address of the memory location in which the result of the partial addition being executed, must be stored.

This address is transferred through the enabled AND gates 40, by microcommand M, to the address register 80 of the main memory. Another microcommand W instructs the main memory to execute a writing operation.

The hardware sequencer, in turn, decodes the address (159), generating a signal on lead 107, which delivers a microcommand *j* for resetting flip-flop 90, and, in case, for loading in flip-flop 59 the condition CO, representative of a carry through the AND gate 37.

The first step of the addition has now been executed. If flip-flop 60 is set, which means that the length of the first operand has been reduced to zero by the decrementing operation, microcommands *i* and *h* are generated. As seen, microcommand *h* enables the loading into register ROSAR of an address *p*, *q*, *r*, specified by microcommand *l*, and inhibits the other channels for updating the microprogram address. The microprogram jumps to the specified address.

If the length of the first operand is not zero, the microprogram steps on to the following microinstruction.

(160) Update address first operand and repeat the sequence

This microinstruction generates microcommands R, Q, S, F, G, U, L. As usual, microcommands R, Q, S specify the register 50 containing the address of the first operand.

Microcommands F,G,U, enable its transfer through channels 62 and 63 to the counting unit 51 which increases the address by one, (under control of microcommand L) and, from there, through channels 64 and 65 to main channels 70, 71, and again into the addressed register. At the same time, microcommand E specifies that the address of the following microinstruction in ROS is address (152), and the loading of this address in ROSAR is enabled. The microprogram steps on, repeating the microinstruction already carried out, with the difference that now, due to microinstruction 159, flip-flop 90 is reset. Therefore, the condition signal CFF I is no longer applied to the sequencer network. The microcommands generated by the sequencer at this stage will be different from the former ones: that is, the microcommands *b*,*c*,*e* and *g* are not delivered, and therefore also the bits 4 to 7 of both operands will be checked for conformity and transferred to the arithmetic unit from register 50, and from the accumulator.

This simple example of the partial execution of an instruction by means of a combined control system, using microprogramming storage and hardware sequencer, allows one to precisely state the characteristic features of the invention.

I. The hardware sequencer provides a means for extending the number of microcommands which may be obtained from a microinstruction without requiring an extension of the length of the microinstruction. This appears clearly, for example, by instructions (151), (153), (154), (156) etc.: in all these cases, it is sufficient to decode the addresses of the microinstructions (and, where applicable, use only the microcommand A) for generating each time, by means of the hardware sequencer, a set of additional microcommands, *a*,*b*,*c*,*d*,*e*,*f*,*g*,*h*,*i*,*j*,*l*,*m* in any desired combination.

II. The hardware sequencer operation is not bound to the operation of the microprogramming storage. It is put in operation only if needed. For example, microinstructions (152) and (155) do not require its operation.

III. The additional microcommands of the hardware sequencer are not fixedly bound to the contents of the microinstructions, but are loosely related to the addresses of the same. Considering microinstructions (154) and (157), it may be seen that these microinstructions, apart from the address of the register containing the operand, (addressed by different combinations of P, Q, R), are identical; however, they generate different microcommands, in response to the two different addresses (154) and (157).

IV. The additional microcommands of the hardware sequencer are not dependent only on the addresses of the microinstruction, but depend also on the condition signals. As seen, the microinstruction (153) generates a set of additional microcommands if executed for the first time during a microprogram, and a different time in the subsequent executions.

V. The additional microcommands from the hardware sequencer are not bound to change in step with the stepping on of the reading out of the microinstructions in ROS: they may be generated at a different speed, usually higher, and therefore provide the possibility of obtaining, from a single ROS microinstruction, a sequence of microinstructions.

Consider for example the microinstructions (153) and (154).

The first one generates the set of microcommands:

A, Q, R, S, T, U, V, C.

and the second one the set:

A, Q, R, S, F, G, U.

The operand address is the same for both instructions: they differ only by the microcommands T,V,C, present only in the first microinstruction and by microcommands F, G, present only in the second one.

Figure 5:
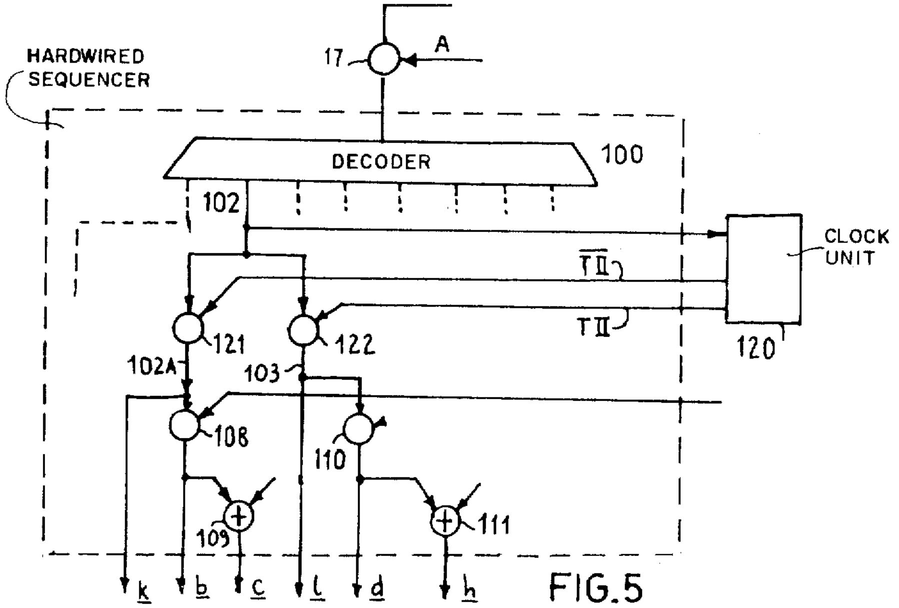
FIG. 5 shows a variant of the network of FIG. 4.

A single microinstruction generating all microcommands A, Q, R, S, T, U, V, C, F, G, may replace both microinstructions, if suitable means is provided for splitting the time allowed to the microinstruction. This means is shown for example in FIG. 5, which shows only the components needed for understanding the operation of the hardware sequencer of FIG. 4, modified for the needs of the operating mode described hereafter.

If the address decoded by decoder 100 is the instruction address (153), a signal is generated on lead 102, and is applied to the clock unit 120, controlling the clocking of the microcommands of the central processing unit. This signal instructs the clock unit that the current microinstruction must be split into two subsequent microinstructions to be executed in a single microinstruction cycle.

In response to this signal the clock unit divides the microinstruction cycle into two phases.

During the first phase the clock unit delivers an inverted signal TII and during the second phase a direct signal TII. Through the AND gates 121 and 122 these signals respectively enable the connection of lead 102 to lead 102 A, and respectively to lead 103.

The signal on lead 102 A generates, through AND gate 108 and OR gate 109 the already known microcommands *b* and *c*, and in addition a microcommand *k*. The signal on lead 103 delivers the already known microcommand *l*, and, in predetermined conditions, also microcommands *d* and *h*. Thus, microcommand *k*, present only in the first phase, may be used for inhibiting, by means of AND gates not shown the operation of microcommands F and G during the first phase, and microcommand *l*, which is present only in the second phase, for inhibiting, in this second phase, the operation of the microcommands T,V,C. Thus, the microinstruction generating microcommands A, Q, R, S, T, U, V, C, F, G is split, during a cycle of microinstruction, into two microinstructions, the first one generating the microcommands A, Q, R, S, T, U, V, C, and the second one generating the microcommands A, Q, R, S, F, G, U, corresponding respectively to microinstructions (153) and (154)

It is clear that the same combination and static-dynamic extension of microinstructions may be carried on, according to the same criteria, and with suitable modifications,, even when the hardware sequencer is associated to a microprogramming system by the means shown in FIG. 2, wherein the intervention of the hardware sequencer is obtained by a special microinstruction.

What is claimed is:

1. A microprogrammed digital electronic data processing system comprising:

a microprogram control unit comprising a microprogram store for storing a sequence of microinstructions with individual microinstructions at respective address locations in said store;

a loadable address register for storing an address code and addressing said microprogram store;

read out means responsive to a said stored address code for reading out a said microinstruction from said store;

an output register for storing a said microinstruction read out from said microprogram store;

a first decoder for decoding the content of said output register as a set of microcommands; and hardwired sequencer means having a set of inputs and a set of outputs, said hardwired sequencer means including gate means responsive to one of said microcommands for coupling said address code from said loadable address register to said set of inputs of said hardwired sequencer means, said hardwired sequencer means further including conversion means for converting said address code to a set of additional microcommands on said set of outputs of said hardwired sequencer means.

2. The digital electronic data processing system of claim 1, wherein said hardwired sequencer means is provided with a second set of inputs fed by condition signals representative of conditions existing in said data processing system.

3. The digital electronic data processing system of claim 2, wherein said hardwired sequencer means further includes a plurality of sequence control gate means and a like plurality of clock inputs, said clock inputs being connected to respective sequence control gate means and receiving respective signals from a clocking device in successive phases of a clocking interval for enabling said sequence control gate means during respective phases of said clocking interval, and said hardwired sequencer means further includes means for generating a sequence of sets of additional microcommands, each set corresponding to one of said sequence control gate means.

4. The digital electronic data processing system of claim 3, further comprising gating means, controlled by at least some of said additional microcommands to inhibit loading of a new address code into said address register.

5. A microprogrammed digital electronic data processing system comprising:

a microprogram control unit comprising a microprogram store for storing a sequence of microinstructions with individual microinstructions at respective address locations in said store;

a loadable address register for storing an address code and addressing said microprogram store;

read out means responsive to a said stored address code for reading out a said microinstruction from said store;

an output register for storing a said microinstruction read out from said microprogram store;

a first decoder for decoding the content of said output register as a set of microcommands for controlling particular operations in said system; and hardwired sequencer means including a state register for storing at least one of the microinstructions read out from said microprogram store, gating means controlled by selected ones of said set of microcommands to enable loading of said at least one of the microinstructions into said state register for storage therein, and a second decoding network having a set of inputs and a set of outputs, said set of inputs being fed by said state register, said decoding network providing at the set of outputs a set of additional microcommands for controlling additional particular operations in said system.

6. The digital electronic data processing system of claim 5, wherein said second decoding network is provided with a second set of inputs fed by condition signals representative of conditions existing in said data processing system.

7. The digital electronic data processing system of claim 6, further comprising second gating means controlled by at least one of said additional microcommands to inhibit loading of a new address code into said address register.

8. The digital electronic data processing system of claim 7, further comprising third gating means controlled by a selected one of said additional microcommands to enable loading, in at least part of said state register, selected ones of said additional microcommands for storage therein.

* * * * *